Feb. 1, 1955 — R. E. ANDERSON — 2,701,336
FLAW DETECTOR
Filed Sept. 15, 1951 — 3 Sheets-Sheet 1

Inventor:
Roy E. Anderson,
by Paul A. Frank
His Attorney.

Inventor:
Roy E. Anderson,
by Paul A. Frank
His Attorney.

United States Patent Office

2,701,336
Patented Feb. 1, 1955

2,701,336

FLAW DETECTOR

Roy E. Anderson, Schenectady, N. Y., assignor to General Electric Company, a corporation of New York Application September 15, 1951, Serial No. 246,840

23 Claims. (Cl. 324—54)

This invention relates to a flaw detector. More particularly, the invention relates to a mechanism for detecting flaws in insulating materials.

In the manufacture of insulating materials, it is necessary that some dependable means be provided for determining the location of flaws in the insulating material during its manufacture so that steps may be taken to correct the defects prior to its completion. In the past, such material has been inspected visually, and the flaws detected, corrected at the time they were located. This method of determining flaws is, of course, extremely slow and inefficient. In addition, the method provided no means for determining the over-all quality of the material other than whatever concept the individual making of visual inspection retained in his mind. While the need for a suitable mechanism for automatically detecting flaws in material has long been recognized, the provision of such a mechanism has been complicated due to the fact that insulating material making machines on which such mechanisms would be used run at varying speeds dependent upon the quality of insulating material to be produced, the quality of the material produced on a particular machine (and therefore the number of defects or flaws tolerated) varies from time to time, and personnel available for running such mechanisms are relatively unskilled.

It is, therefore, one object of the present invention to provide an automatic operating flaw detecting mechanism for determining the location of flaws in insulating material.

Another object of the invention is to provide a flaw detecting mechanism which can be readily adjusted to detect flaws of different size and, therefore, can be used with insulating material of varying quality.

Still another object of the invention is to provide an automatic flaw detecting mechanism which can be adapted to determine flaws in insulating material traveling at varying speeds.

A further object of the invention is to provide a flaw detecting mechanism which can produce a continuous indication, that may or may not be recorded, of the over-all quality of the insulating material with reference to a predetermined standard.

A still further object of the invention is to provide a single flaw detecting mechanism for use with insulating material which is capable of accomplishing all of the above set forth objects, and which can be operated by relatively unskilled personnel.

In its broader aspects, my invention provides a flaw detecting mechanism for insulating materials which includes a scanning assembly for scanning a predetermined width of the insulating material. The scanning assembly comprises a probe means disposed near the insulating material in such a manner that as the insulating material moves, the portions of the material immediately adjacent the probe means is scanned by an electric field produced thereby. Also included in the flaw detecting mechanism is a flaw signal deriving means which is operatively coupled to the scanning assembly and coacts therewith to produce identifying electrical signals indicative of the location of flaws existing in the portions of the insulating material being scanned.

In addition to the above basic structure, the flaw detecting mechanism also preferably includes circuit means which comprise a part of the flaw signal deriving means, for determining the size and number of flaws occurring in a predetermined length of the material being scanned, and a measuring circuit likewise operatively included in said flaw signal deriving means for producing an indication of the overall quality of desired length of the insulating material. Further, to facilitate operation of the flaw detecting mechanism by relatively unskilled personnel, additional means such as an automatic cut-off, manual on-and-off starting circuits, may be included in the preferred embodiment of the mechanism.

Other objects, features and many advantages of this invention will be appreciated more readily as the same becomes understood by reference to the following detailed description, when considered in connection with the accompanying drawings wherein like parts are identified by the same reference character, and wherein.

OVER-ALL CONSTRUCTION

The preferred embodiment of the flaw detector mechanism comprises essentially two basic parts—a scanning assembly, and a flaw signal deriving means; and, if desired, may include a third auxiliary control system which is added to enhance the value of the detector mechanism and simplify its operation. The scanning assembly electrically scans the insulating material being tested, and produces a flow of electrical current across portions of its length which is subtended by flaws in the insulating material. The flaw signal deriving means utilizes the electrical current produced by the scanning assembly, and develops a perceptible indication of the current flow. The flaw signal deriving means may include either one, and preferably includes both, circuit means comprising a plurality of flaw indicating signal developing circuits located with respect to the scanning assembly in such a manner that a perceptible indication of the position of the flaws detected is produced thereby, and a quality measuring circuit which derives an indication of the over-all quality of the insulating material being tested by the flaw detector. In addition to the above two basic parts of the detector, an additional control system providing means for starting, stopping, and automatically shutting off the detector mechanism, is preferably included so that the operation of the mechanism is simplified.

SCANNING ASSEMBLY

Figure 1:
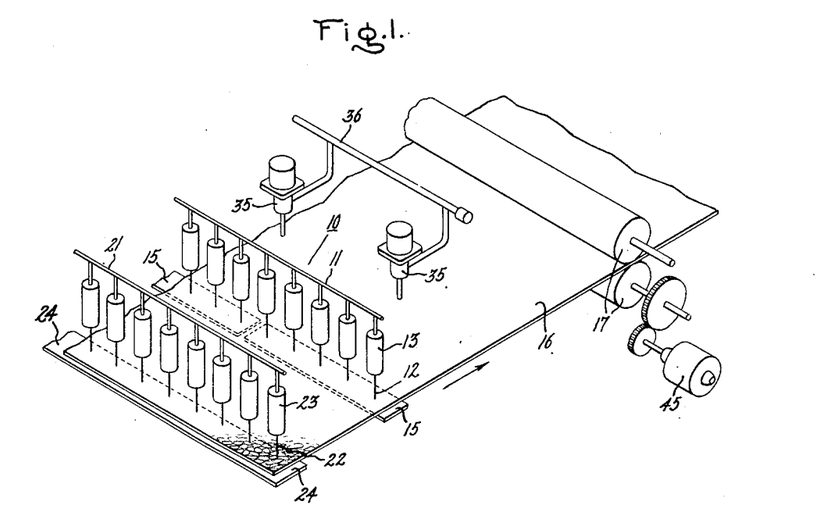
Fig. 1 is a perspective view of a portion of a schematic arrangement of the flaw detecting mechanism comprising the invention, and shows the mechanical arrangement of certain parts of the mechanism, and their relation to the insulating material to be tested.

Referring now to the drawings, Fig. 1 is a fragmentary view of a portion of the detector mechanism and illustrates the mechanical structure of the scanning assembly and the physical relation of the scanning assembly to the insulating material being tested. The scanning assembly includes a first elongated probe means shown broadly at 10, which comprises an upper elongated conductive member 11 having a plurality of downwardly depending pointed probe teeth 12 connected thereto through a respective one of a plurality of resistors 13. The conductive member 11, and therefore probe teeth 12, is operatively connected to one terminal of a source of electric potential 14 which is of standard construction available on the market commercially, and which has a voltage rating determined by the type of insulating material with which the detector is used. Cooperating with the pointed ends of probe teeth 12 is a conductive means comprising a plurality of electrically conductive members 15 which are in longitudinal alignment with the upper probe member 11, and physically disposed adjacent to, and spaced from, the pointed ends of the probe teeth 3. Each of the conductive members 15 is operatively connected to the remaining terminal of the source of electric potential 14 in such a manner that an electric field is produced across the space between the pointed ends of the probe teeth and the conductive member through which the insulating material 16 is caused to pass. By constructing the scanning assembly in this manner, each of the conductive members together with their respective associated pointed probe teeth, serves to divide the elongated probe means into a plurality of elemental lengths, the number of which are dependent upon the width of the insulating material to be inspected by the scanning assembly, and which are individually identified with a particular portion of the width of material being scanned.

When placing the detector mechanism in operation, the insulating material to be tested is threaded between the pointed ends of the probe teeth 12 and the conductive member 15 so that the entire width of the material is scanned by the elongated probe means. As the detector is preferably mounted on the insulating material making machine, the insulating material is generally in the form of a wide belt that moves relative to the scanning assembly, and may be driven by means such as a driving roller 17 illustrated in Fig. 1. The exact value of the potential applied across the elongated probe means 10 should be such that a corona discharge occurs between the end of a pointed probe tooth and its associated conductive member 15 upon the appearance of a flaw in that portion of the material disposed between the point and its conductive member, but which is sufficiently low in value that no conduction occurs between the ends of the probe teeth and their respective members when the material disposed therebetween has no flaws in it.

Figure 3:
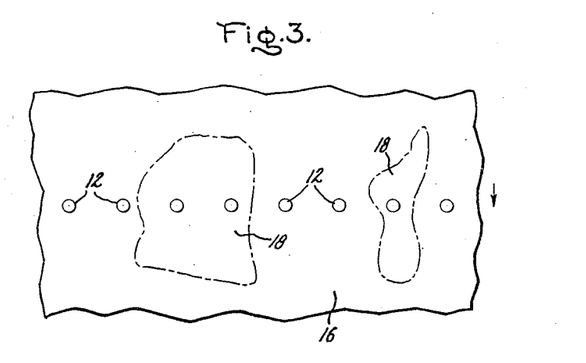
Fig. 3 is a fragmentary view of a portion of insulating material showing random flaw areas thereon, and the manner in which the flaw areas are located by the insulating material scanning assembly of the mechanism.

Referring now to Fig. 3 of the drawing, the manner in which the probe assembly operates to identify different types of flaw areas 18 on material 16 as the same are momentarily disposed under certain ones of the probe teeth 12, is illustrated. From Fig. 3 it is apparent that if the flaw areas 18 are sufficiently large to subtend at least two probe teeth 12, the conduction current occurring between the probe teeth and their respective conductive members will be substantially twice as large as would be the case if only one probe tooth were subtended by the flaw area. Consequently, the value of the current flowing to the conductive members 15 at any particular instant is a measure of the size of the flaw in a direction transverse to the path of movement of the insulating material. Likewise, the length of time that conduction current continues between the probe teeth and their respective conductive members produces an indication of the size of the flaw in the direction of travel of the material. Thus, by determining the current flow through conductive member 15 over some predetermined time period, some idea of the quality of the tape passing through the scanning assembly can be obtained. And, by identifying which ones of the pointed probe teeth are conducting, the location of the flaws appearing in the insulating material, can be established.

In order that the sensitivity of the scanning assembly be maintained upon conduction occurring between one or more of the probe teeth and their associated conductive member 15, a series resistor 13 is included in the circuit between each probe tooth and the source of potential 14 to limit the current flowing through any one tooth to some predetermined value, and thereby prevent any substantial drop in the voltage applied across the remainder of the probe teeth. By this construction, the sensitivity of the probe assembly is not seriously impaired after one or more of the teeth conduct due to the occurrence of flaws. Further, to assure that the current flowing through conductive members 15 is due solely to corona discharge current brought about by the occurrence of flaws, additional elongated probe means are provided. The additional probe means includes an elongated probe member 21 having a plurality of pointed probe teeth 22 connected thereto through a voltage dropping resistor 23 and a cooperating lower conductive member 24, and is physically disposed adjacent to, and ahead of, the first-mentioned elongated probe means so as to precharge the insulating material prior to the same being scanned. Consequently, the current flowing to the conductive members 15 is purely an indication of the flaws appearing in the portion of the material between the pointed probe teeth 12 and the conductive members 15 due to the fact that it is not masked by any charging current which the insulating material might tend to take off of the scanning probe means. Accordingly, it can be used to develop a flaw indicating signal by the flaw signal deriving means.

FLAW SIGNAL DERIVING MEANS

Figure 2:
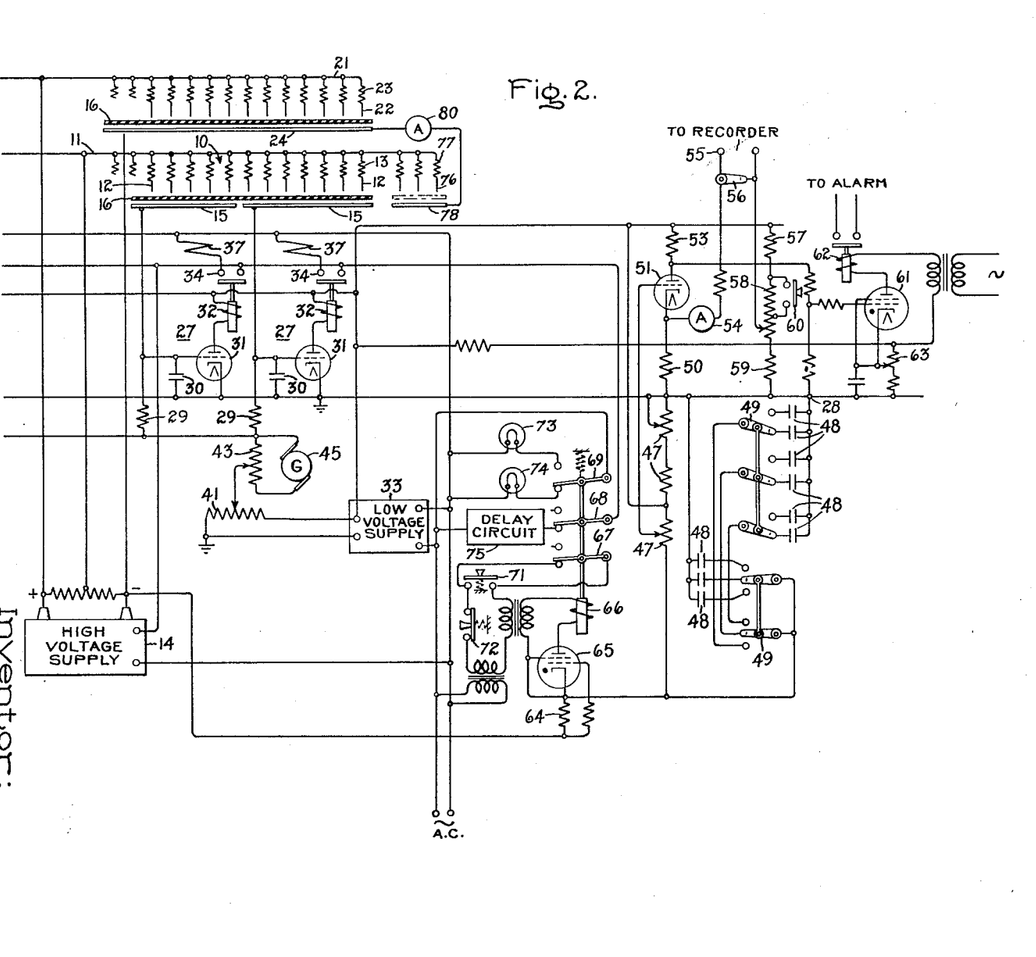
Fig. 2 is a schematic circuit diagram of the flaw detecting mechanism, illustrating the electrical connections between the various parts of the mechanism.

In the preferred embodiment of the detector mechanism, the flaw signal deriving means preferably includes a circuit means comprising a plurality of similar flaw indicating signal developing circuits, shown broadly at 27 in Fig. 2, and a quality measuring circuit 28. If desired, the flaw detector mechanism may incorporate a flaw signal deriving circuit means which utilizes either the flaw signal developing circuit means alone or the quality measuring circuit alone, depending upon the use for which it is intended; however, the detector mechanism preferably includes both of the said circuits.

*Flaw signal developing circuits*

With reference now to Fig. 2 of the drawings, each of the similar flaw signal developing circuits 27 is operatively connected to a respective one of the conductive members 15, and includes an impedance preferably comprising a resistor 29 connected to a respective conductive member 15 and a capacitor 30 coupled in parallel therewith. Resistor 29 and capacitor 30 together form a totaling network having a predetermined time constant dependent upon the average quality material to be tested by the mechanism, and serve to total or integrate the current through their respective conductive member. Coupled across the impedance formed by the totaling network 29 and 30 is the input or control grid, of an electron tube 31 having its cathode connected to a ground busbar, and its plate connected through a relay winding 32 to a source of direct current plate potential 33. Relay winding 32 has a movable switch arm 34 connected in circuit relationship with an electrically operated indicating device, such as a fluid marking apparatus, a light, or some other similar indicating means that is individually identified with a portion of the width of insulating material being scanned, so as to give a perceptible indication of the location of the flaws.

In operation, upon conduction between any one or more of the probe teeth and it or their respective conductive member 15, current flow through the impedance or resistor 29 of the respective flaw signal developing circuit connected to a particular conductive member produces a voltage drop which is proportional to the number of probe teeth that are conducting and, therefore, the size of the flaw occurring in the material being scanned. If desired, the voltage thus produced may be utilized directly to control the operation of an indicating means. However, the voltage is preferably integrated over a predetermined time period by the totaling network comprising resistor 29 and capacitor 30, and is indicative of the condition of a given area of the insulating material. This voltage is then coupled to the control grid of electron tube 31, and causes the tube to conduct at some predetermined value depending upon the type of flaw to be indicated. The current flow in the plate circuit of the electron tube is then utilized to operate the indicating means.

In the preferred embodiment of the detector mechanism, the particular indicating means used comprises a plurality of solenoid operated valves 35, best seen in Fig. 1, each of the valves being physically positioned adjacent to a respective one of the conductive members 15 in such a manner that as the material passes over one of the conductive members 15, it thereafter immediately passes under the solenoid operated valve 35 associated with that respective conductive member. Each of the valves 35 is connected to a fluid container through a conduit 36, and has the solenoid winding thereof, schematically illustrated by a winding 37 shown in Fig. 2, electrically connected in series circuit relationship with the movable switch arm 34 of the relay 32 connected in the plate circuit of its respective electron tube 31. The circuit formed by all of the windings 37 of the solenoid valve and contacts 34 in parallel are connected across an alternating current supply so that upon closure of any one of the contacts 34, the solenoid operated valve connected therewith in electrical series circuit relationship ejects a marking fluid upon the insulating material, thereby marking the location of the flaw detected.

Figure 4:
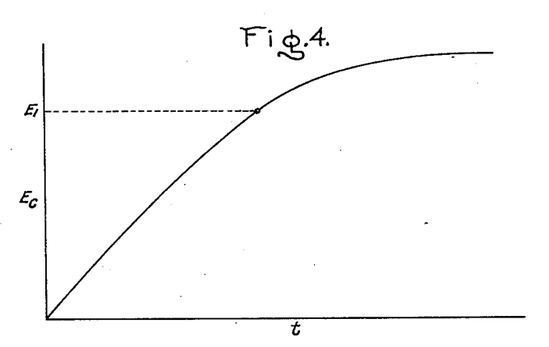
Fig. 4 is a graph illustrating the voltage vs. time characteristic of the flaw signal developing circuits comprising a part of the preferred embodiment of the detector mechanism.

Referring now to Fig. 4 of the drawings, the charging voltage versus time characteristic of each of the capacitors 30 is illustrated. As is readily apparent, this voltage rises exponentially with time when the current through resistor 29 is constant. By controlling the potential E, at which each of the electron tubes 31 conducts, and setting the same at some point on the linear portion of the characteristic curve of the totaling network, an adjustable standard or reference point can be established for identifying the type or extent of flaws detected, and therefore the quality of the material. The potential $E_1$ at which each one of the electron tubes 31 will be rendered conductive is dependent on two factors, the bias applied to the control grid by the control grid biasing means, and the amount of current flowing through its respective resistor 29 during one time period of the totaling network comprised by resistor 29 and capacitor 30. As the amount of current flowing in the resistor 29 during one time period is dependent upon the number of pointed probe teeth that are conducting, and the length of time that any one probe tooth continues to conduct, the number of times that the potential on capacitor 30 reaches cut-off voltage $E_1$ in a given length of travel of insulating material varies in accordance with the type or character of flaws crossing under the pointed probe teeth, and the number of such flaws occurring during one time period of the totaling network. This fact can be better appreciated by referring to Fig. 3, wherein it is apparent that if two or more probe teeth be subtended by a flaw in the insulating material, the charge on capacitor 30 will build up to cut off potential for a shorter length of travel of the insulating material than would be the case if only one probe tooth was conducting.

Should it be desired to produce a very high quality insulating material, the voltage $E_1$ at which the electron tube 31 conducts would be established at a relatively low value on the voltage versus time characteristic curve shown in Fig. 4. In this event, only a small number of flaws passing under the pointed probe teeth would be required in order for the charge in the totaling network associated with those teeth to build up to the necessary cut off voltage, at which time the indicating device operated by relay 32 in the plate circuit of tube 31 would be actuated. Should it be desired to produce a lower quality material, the cut-off voltage $E_1$ of electron tube 31 could be raised to a much higher point on the characteristic curve, and it would be necessary for a greater number of flaws, or for flaws of larger size, to pass underneath the probe teeth within the time period of the totaling network in order for the charge on the totaling network to build up to the required cut-off potential. Thus, it is seen that by adjusting the value of the cut-off potential of the electron tube 31, a means for establishing an adjustable standard or quality reference point for the type of flaws indicated by the flaw detector, is provided.

In order to adjust the potential at which electronic tubes 31 are rendered conductive, and therefore the quality reference point of the detecting mechanism, control grid biasing means are included in the flaw detecting mechanism. As is best shown in Fig. 2 of the drawings, the control grid biasing means includes an adjustable, steady state, control grid biasing network which comprises a variable tapped resistor 41 coupled across a portion of the low voltage supply source 33 and connected through a second variable tap resistor 43, and each of the resistors 29 to the control grids of all the electron tubes 31. With the above-described circuit included in the detecting mechanism, the reference potential E, at which all of the electron tubes 31 are rendered conductive, can be readily established at any desired point along the characteristic curve of the totaling networks by adjusting the position of the variable tap on resistor 41.

Figure 5:
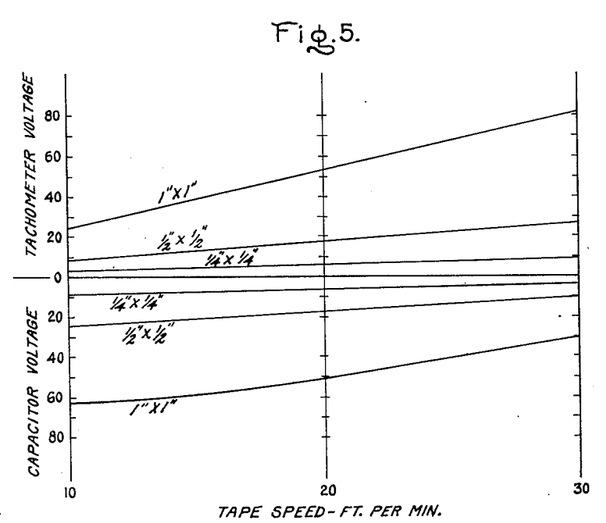
Fig. 5 is a graph illustrating the manner in which a varying bias signal proportional to the speed of the insulating material being tested can be developed, and utilized in the flaw signal developing circuits in a preferred embodiment of the mechanism, to determine the point at which such circuits will operate to produce an indication of the flaws occurring in the material.

If the detector mechanism were to be used with insulating material traveling at a constant speed, the above-described structure would be all that would be required in the grid biasing means. However, since it is desirable that the detector mechanism be used with insulating material traveling at varying speeds, some means must be provided for compensating for the effect of the varying speed of the material on the build-up of the potential produced across each of the capacitors 30. The need for such a means can be better appreciated by reference to Fig. 3 of the drawings, wherein it is clear that if the belt of insulating material 16 were moving at a relatively slow rate, conduction through the pointed probe teeth 17 would occur for a much greater length of time for a given size flaw than would be the case if the belt of insulating material were moving at a faster rate, and the potential on the capacitors 30 would build up to cut-off potential in a shorter length of travel of the insulating material than it would at faster speeds. Consequently, it is necessary to introduce a varying bias signal proportional to the speed of the insulating material into the bias applied to the control grids of electron tubes 31. The means for producing a varying bias voltage proportional to the speed of the insulating material preferably comprises a tachometer generator 45 coupled to the driving rolls for the insulating material in the manner best seen in Fig. 1 of the drawings, and having its output coupled across the variable tapped resistor 43 in the manner shown in Fig. 2 of the drawings. By coupling the output of tachometer generator 45 across resistor 43 in opposition to the voltage produced thereacross by the low voltage supply 33, the biasing voltage applied to the control grids of electron tubes 31 can be varied in a manner shown in Fig. 5 of the drawings. Fig. 5 is a graph of the output voltage of tachometer generator 45 plotted against the insulating material speed, and of the algebraic sum of voltage required across capacitors 30 in order to render electron tubes 31 conductive, plotted against the insulating material speed. Three curves are illustrated, one shows the voltage characteristic for insulating materials of a relatively high quality, i. e., for flaws which are of small size and few in number, and the remaining two curves show the plot for medium and low quality materials. By referring to the capacitor voltage versus material speed characteristic curve, it can be seen that the potential required to cause each electron tube 31 to conduct drops sharply with an increase of speed in the insulating material, thus compensating for the shortened time that capacitors 30 are charged for a given size flaw.

From the foregoing description, it can be appreciated that the provision of the variable grid biasing means, along with the totaling networks, connected in the control grid circuits of the electron tubes 31, renders the flaw detecting mechanism capable of detecting flaws of varying sizes in materials of varying quality while moving at different speeds. In addition to the above features, it is also desirable that the flaw detecting mechanism include some means for indicating the overall quality of the material, and for this purpose the quality measuring circuit described hereinafter is included.

*Quality measuring circuit*

The quality measuring circuit of the flaw signal deriving means includes a main adding resistor 47 which is connected in electrical series circuit relationship between the negative terminal of the source of potential 14, and all of the conductive members 15 of the elongated probe means in parallel. By this construction, current produced in any one of the conductive members 15 must travel through the main adding resistor 47, in order to get back to the negative terminal of source of potential 14 from the positive terminal of the potential source after passing through pointed probe teeth 12. Thus, it can be appreciated that the current flowing through resistor 47 is dependent upon the current flowing in all of the conductive members, and therefore dependent upon the number of flaws in the entire width of the insulating material being scanned. Consequently, the current in resistor 47 can be used as a measure of the overall quality of the insulating material. To facilitate measuring the current in resistor 47, a bank of capacitors 48 is provided along with a selective switching arrangement 49 whereby any one of the different size capacitors 48 can be switched into circuit relationship with the resistor 47. Upon any one of the capacitors 48 being selectively connected across resistor 47, the resulting network comprises an averaging circuit, the time constant of which is dependent upon the value of capacitor 48 selected, and which in turn is dependent upon the length of material over which it is desired to obtain a measure of the average quality.

In order to furnish a perceptible indication of the integrated value of all of the flaw signals produced by the elongated probe means, and derived by the flaw signal deriving means, the quality measuring circuit includes an indicating instrument means comprising an electron tube 51 and having the control grid thereof connected to a variable position tap on the main adding resistor 47, and having a load resistor 50 in the cathode circuit thereof, and a load resistor 53 in the plate circuit thereof. The cathode load resistor 50 is coupled through an ammeter 54, through a pair of output terminals 55 adapted to have a recording apparatus connected thereto if desired, and bypassed by a shorting switch 56, to a midpoint on a voltage dividing network comprising resistors 57, 58 and 59.

In operation, the average value of the signal appearing across resistor 47 is applied to the control grid of electron tube 51 and controls the value of the current flowing through electron tube 51, cathode load resistor 50, and plate load resistor 53. Thus, the voltage appearing across cathode load resistor 50 is a function of the current flow produced in all of the conductive members 15, and therefore indicative of the over-all number of flaws in the portion of insulating material being inspected by the scanning assembly. This voltage is compared to a reference potential obtained on the voltage dividing network 57, 58 and 59 by means of the electrical conductor having the ammeter 54 connected therein. The reference potential across the voltage dividing network is obtained by balancing the voltage across resistor 50 for a no flaw signal condition against an equal potential across the voltage dividing networkq, so that no current flow is indicated by the ammeter 54. With the circuit thus adjusted, the balance of the network thus formed will be disturbed upon the occurrence of a flaw signal, and the current thfrough meter 54 will be a measure of the overall quality of insulating material.

At this point, attention is invited to the function that the precharging probe structure 21 through 24 performs in the overall flaw detecting mechanism. By tracing through the excitation circiut for the elongated scanning probe means 10, it can be seen that in order for the corona discharge current collected on all of the conductive members 15 to get back to the negative terminal of the source of potential 14, the current must pass through main adding resistor 47. Should the insulating material 16 have a relatively high dielectric constant, this material as it passes under the scanning elongated probe means will tend to acquire a charge which would result in a current flow through resistor 47 that would tend to mask the current flow due to flaws. For this reason, the precharging electrode or probe structure is provided for charging the insulating material 16 prior to the same reaching the scanning elongated probe means 11. By an inspection of Fig. 2, it can be readily seen that the pointed probe teeth 22 of the precharging probe structure are all connected in parallel to one terminal of the source of potential 14, and the cooperating lower conductive member 24 of the precharging probe structure is directly connected to the remaining terminal of the source, consequently the charging current drawn by the insulating material as it moves under the precharging probe structure does not appear across the main adding resistor 47, and does not mask flaw indicating signals. It should be noted, however, that the existence of a charge on the insulating material 16 in no way affects the manner in which flaws in the material cause a corona discharge current between the pointed probe located over the flaw in question, and the cooperating conductive member 15.

In addition to the indication provided by the ammeter 54 of the overall quality of the insulating material, an additional alarm circuit is provided for comparing the overall quality of the insulating material to a predetermined standard, and for producing a perceptible indication if the quality of the insulating material falls below the predetermined standard. This last mentioned means comprises a thyratron tube 61 having its control grid coupled to the plate load resistor 53 of electron tube 51, and having a relay 62 connected in its plate circuit. The cathode of thyratron tube 61 is connected to a variable tap conductor that can be adjustably positioned along a voltage dividing resistor 63, and by varying the position of the adjustable tap in the cathode circuit, the potential at which thyratron tube 61 fires can be controlled, thereby providing a means for establishing a reference quality level. In operation, should the voltage appearing across plate load resistor 53, which is a function of the overall quality of the material being inspected by the scanning assembly, stay below the reference potential set or applied to the cathode of thyratron tube 61, thyratron tube 61 remains non-conductive, and no indication will be given by the alarm circuit. However, should the voltage across plate load resistor 53 rise due to the fact that the material being scanned becomes of poor quality, the control grid of thyratron tube 61 is driven sufficiently positive to allow the thyratron to conduct, in which event the relay 62 is closed, and an alarm is sounded.

Because of the fact that a thyratron tube control grid no longer exercises control over the tube once the same is conducting, some means must be provided for quenching the tube after it has fired. For this purpose, alternating current from the A.-C. supply terminals is applied to the plate of thyratron 61, and serves to operatively drive the plate of thyratron 61 below cut-off. Hence, for as long as the flaw signal potential applied to the control grid of the thyratron remains sufficiently high to fire tube 61, the tube will alternately conduct on the positive half-cycles of the A.-C. current applied to its plate, and the alarm circuit will be intermittently sounded. However, should the potential applied to the control grid drop below the value required to fire tube 61, the tube will not conduct during the positive half-cycles of the A.-C. current on its plate, thereby indicating that the quality of the material has improved sufficiently to meet the required standard.

CONTROL SYSTEMS

In addition to the above-described basic systems of the flaw detecting mechanism, certain other control circuits are included as part of the overall mechanism to enhance the utility of the mechanism, and to simplify its operation. The additional control circuits may include an automatic cutoff control which comprises a thyratron tube 65 having its cathode coupled to a resistor 64 connected in series circuit relationship between the main adding resistor 47 and the negative terminal of the source of potential 14. Thyratron 65 has its plate connected through the field winding 66 of a solenoid-operated relay having a plurality of movable switch arms 67, 68 and 69, and to the secondary winding of a transformer operatively coupled across the alternating current supply terminals. The thyratron is biased so as to be normally conducting in order that its plate current actuate the relay 66, and cause the switch contacts 67, 68 and 69 to be maintained in the position shown in Fig. 2 of the drawings. Upon the occurrence of an overload condition due to excessive conduction across the pointed probe teeth of the elongated probe scanning means, the voltage developed across resistor 64 drives the cathode of thyratron 65 sufficiently positive to cause the thyratron to cut off, whereupon the switch contacts of the relay 66 are opened, or alternatively thrown to a second position, by a mechanical spring means connected to the shaft common to all the movable switch arms 67, 68 and 69. This action serves to open movable switch arm 68 as to de-energize the scanning probe assembly and the field windings of the electrically operated marking devices thereby rendering the flaw detecting mechanism inoperative.

In addition to providing the automatic cut-off feature described above, relay 66 serves to operate a holding circuit through movable switch arm 67 that by-passes a starting switch 71 included in the current supply circuit to thyratron tube 65. Also included in the current supply circuit is a normally closed stopping switch 72 which is in series circuit relationship with starting switch 71 and movable switch arm 67, and can be used to manually stop the flaw detecting mechanism when desired. Relay 66 also serves to energize a pair of on-off lights 73 and 74 which provide a visual indication of the condition of the mechanism. Further control features may be added to the detector such as a heating element for maintaining the humidity of the air in the vicinity of the pointed probe teeth 12 within a given range, and an air blower to assist the heater element in maintaining proper conditions around the probe assembly. Also a calibrating probe structure may be included in the system which comprises a plurality of additional teeth 76 coupled through a plurality of series resistors 77 to upper conductor 11, and cooperating with a lower conductive member 78. Other refinements which would enhance the utility of the mechanism, and simplify its operation, may also be included if desired.

In order to place the flaw detecting mechanism in operation, the current supply leads of the mechanism are first connected across a standard source of alternating current supply. Starting switch 71 is then depressed and operates to energize the thyratron tube 65 and causes the same to be rendered conductive. Upon thyratron tube 65 becoming conductive, relay 66 closes each of the movable switch arms 67, 68, and 69, each of which operates to supply current to its respective circuit. As set forth above, movable switch arm 67 comprises a part of a holding circuit, and serves to maintain the source of current supply to the plate of thyratron tube 65, thereby permitting the main starting switch 72 to be released. Movable switch arm 68 is included in series with a delay circuit 75 with both the delay circuit and switch arm 68 in series circuit relationship with all of the field windings of the electrically-operated marking device in parallel and with one input terminal of the source of potential 14. Switch 68 serves to energize all of the elements after a certain delay period brought about by reason of delay circuit 75 that allows sufficient time for different components to warm up before the operating voltages are applied thereto. Switch 69 selectively operates a pair of on-off lights 73 and 74 which indicate the condition of the detector mechanism. After closing of all of the switches 67, 68 and 69 by relay 66, the detecting mechanism is in condition for operation, and serves to detect flaws in insulating material passing therethrough in the manner described in the foregoing description. In order to calibrate the mechanism to determine that the corona discharge current occurring when a flaw appears in the insulating material being scanned does not exceed a predetermined value, a portion of the material is caused to pass between calibrating probe teeth 76 and their cooperating conductive member 78. With a portion of the material thus disposed, no current flow should be registered by an ammeter 80 connected in series with conductive member 78 and the negative terminal of source of potential 14. Upon removal of the portion of material, the current flow registered by meter 80 should be some integral multiple (depending upon the number of calibrating probe teeth exposed) times a predetermined value. If such a current reading is not obtained, the value of potential supplied by source 14 should be adjusted until a proper reading is obtained. When it is desired to discontinue operation of mechanism, all that is required in order to stop it is that the manually operated, normally closed, off switch 72 be actuated, and the mechanism becomes inactivated. Thus, it can readily be appreciated that provision of the controls described hereinabove simplifies the operation of the detector mechanism, and enhances its value.

From the foregoing description, it can be readily appreciated that the invention provides a novel, automatic operating flaw detecting mechanism for determining the location of flaws in insulating materials. The detecting mechanism can be easily adjusted to detect flaws of different character and therefore can be used with materials of varying qualities. The mechanism may also be used on insulating material making machines whereon the insulating material may be moving at different speeds during different periods of time, and can produce an indication of the over-all quality of the material with which it is used. Additionally, the flaw detecting mechanism may be designed in such a manner that all of the above functions are performed by a single mechanism that can be operated by relatively unskilled personnel.

It is obvious that many modifications and variations of the present invention are possible in the light of the above teachings, and it is therefore to be understood that changes may be made therein which are within the full intended scope of the invention as defined by the appended claims.

What I claim as new and desire to obtain as Letters Patent of the United States is:

1. A flaw detector for insulating materials including in combination a source of electric potential, probe means comprising a comb-like structure having a plurality of tooth elements connected to said source of potential and positioned adjacent to but not contacting said material for electrically scanning a predetermined width of the insulating material, respective current limiting resistors connected in series circuit relationship with each tooth element of said comb-like probe means, and circuit means operatively connected to said probe means for producing electrical signals indicative of the location and extent of flaws existing in the portion of the insulating material being scanned.

2. A flaw detector for insulating materials including in combination a source of electric potential, elongated probe means comprising a comb-like structure having a plurality of tooth elements connected to said source of potential and positioned adjacent to but not contacting said material for electrically scanning a predetermined width of the insulating material being tested, respective current limiting resistors connected in series circuit relationship with each tooth element of said comb-like probe means, and circuit means comprising a plurality of flaw signal developing circuits, each of said circuits being coupled to a respective elemental length of said elongated probe means, and all of said circuits serving to produce electrical signals indicative of the flaws existing in the insulating material.

3. A flaw detector for insulating materials including in combination a source of electric potential, elongated probe means comprising a comb-like structure having a plurality of tooth elements connected to said source of potential and positioned adjacent to but not contacting said material for electrically scanning a predetermined width of the insulating material being tested, respective current limiting resistors connected in series circuit relationship with each tooth element of said comb-like probe means, and circuit means comprising a plurality of adjustable cut-off point signal developing circuits, each of said circuits being coupled to a respective elemental length of said elongated probe means, and all of said circuits serving to produce electrical signals indicative of the location and extent of flaws existing in the insulating material.

4. A flaw detector for insulating materials including in combination a source of electric potential, elongated probe means comprising a comb-like structure having a plurality of tooth elements connected to said source of potentialand positioned adjacent to but not contacting said material for electrically scanning a predetermined width of the insulating material being tested, respective current limiting resistors connected in series circuit relationship with each tooth element of said comb-like probe means, circuit means comprising a plurality of signal developing circuits, each of said circuits being coupled to a respective elemental length of said elongated probe means with all of said circuits serving to produce identifying signals indicative of the location and extent of flaws existing in the insulating material, and a quality measuring circuit operatively coupled to said probe means for producing an indication of the over-all quality of the insulating material.

5. A flaw detector for insulating materials including in combination a source of electric potential, elongated probe means comprising a comb-like structure having a plurality of tooth elements connected to said source of potential and positioned adjacent to but not contacting said material for electrically scanning a predetermined width of the insulating material being tested, respective current limiting resistors connected in series circuit relationship with each tooth element of said comb-like probe means, circuit means operatively connected to said probe means for producing electrical signals indicative of the location of flaws existing in the insulating material, said circuit means comprising a plurality of signal developing circuits with each of said circuits being coupled to a respective elemental length of said probe means, and marking apparatus comprising a plurality of electrically operated marking devices, each of said marking devices being physically disposed adjacent a respective one of said elemental lengths of asid probe means and electrically connected to the respective signal deriving circuit corresponding to its associated elemental probe length whereby the location of flaws detected by said probe means is marked on the insulating material.

6. A flaw detector for insulating materials including in combination a source of electric potential, probe means for scanning desired portions of an insulating material, said probe means comprising an elongated probe member having a plurality of pointed probe teeth, a resistor connected in series circuit relation with each of said probe teeth, said probe teeth and the respective resistors thereof being connected in parallel circuit relationship to one terminal of said source of potential and conductive means comprising a plurality of aligned, separate conductive members operatively connected in parallel circuit relationship to the remaining terminal of said source of potential, each of said conductive members being disposed adjacent the pointed ends of a respective predetermined number of probe teeth with the portion of the insulating material to be tested being positioned between the pointed ends of the probe teeth and said conductive members and out of contact with said probe teeth, and circuit means operatively connected to said conductive members for producing an electrical signal indicative of the location and extent of flaws existing in the portion of the insulating material being scanned.

7. A flaw detector for insulating materials including in combination a source of electric potential, elongated probe means comprising a comb-like structure having a plurality of tooth elements connected to said source of potential and positioned adjacent to but not contacting said material for electrically scanning a predetermined width of the insulating material being tested, respective current limiting resistors connected in series circuit relationship with each tooth element of said comb-like probe means, circuit means operatively connected to said probe means for producing electrical signals indicative of the location and extent of flaws existing in the insulating material, said circuit means comprising a plurality of signal developing circuits with each of said circuits being coupled to a respective elemental length of said probe means, marking apparatus comprising a plurality of electrically-operated marking devices, each of said marking devices being physically disposed adjacent a respective one of said elemental lengths of said probe means and electrictrically connected to the respective signal developing circuit corresponding to its associated elemental probe length whereby the location of flaws detected by said probe means is marked on the insulating material, and a quality measuring circuit operatively coupled to said probe means for producing an indication of the over-all quality of the insulating material.

8. A flaw detector for insulating materials including in combination a source of electric potential, elongated probe means for scanning desired portions of an insulating material, said probe means comprising a comb-like structure having a plurality of aligned pointed tooth elements connected to one terminal of said source of potential, respective current limiting resistors connected in series circuit relationship with each tooth element of said comb-like probe means, and conductive means operatively connected to the remaining terminal of said source of potential and disposed adjacent said aligned pointed tooth elements, the material to be tested being positioned between said aligned pointed tooth elements and said conductive means and out of contact therewith so as to be readily movable with respect to the probe means, and circuit means comprising a plurality of signal developing circuits, said circuits being operatively connected to respective predetermined number of said pointed probes and serving to produce electrical signals indicative of the flaws existing in the portion of the insulating material being scanned.

9. A flaw detector for insulating materials including in combination a source of electric potential, elongated probe means for scanning desired portions of an insulating material, said probe means comprising a plurality of aligned pointed tooth elements connected to one terminal of said source of potential, respective current limiting resistors connected in series circuit relationship with each tooth element of said comb-like probe means, and conductive means operatively connected to the remaining terminal of said source of potential and disposed adjacent said aligned pointed tooth elements, the material to be tested being positioned between said aligned pointed tooth elements and said conductive means and out of contact therewith so as to be readily movable with respect to said probe means, circuit means comprising a plurality of signal developing circuits, said circuits being operatively connected to respective predetermined number of said pointed tooth elements and serving to produce signals indicative of the location and extent of the flaws existing in the portion of the insulating material being scanned, and marking apparatus comprising a plurality of electrically operated marking devices, each of said devices being physically disposed adjacent a respective predetermined number of said pointed tooth elements and electrically connected to the respective signal developing circuit corresponding to its associated number of pointed probes whereby the location of flaws detected by said probe means is marked on the insulating material.

10. A flaw detector for insulating materials including in combination a source of electric potential, elongated probe means comprising a comb-like structure having a plurality of tooth elements connected to said source of potential and positioned adjacent to but not contacting said material for electrically scanning a predetermined width of the insulating material being tested, respective current limiting resistors connected in series circuit relationship with each tooth element of said comb-like probe means, and circuit means comprising a plurality of impedances with each of said impedances being connected to a respective elemental length of said elongated probe means, and a plurality of electron tubes having the respective control grids thereof coupled to a respective one of said impedances for developing electrical signals indicative of the flaws existing in the insulating material.

11. A flaw detector for insulating materials including in combination a source of electric potential, elongated probe means connected to said source of potential for electrically scanning a predetermined width of the insulating material being tested, and circuit means comprising a plurality of impedances with each of said impedances being connected to a respective elemental length of said elongated probe means, a plurality of grid controlled electron discharge devices having the respective control grids thereof coupled to a respective one of said impedances for developing electrical signals indicative of the flaws existing in the insulating material, a second impedance coupled in series circuit relationship with all of said first mentioned impedances in parallel, and means coupled to said second impedance for deriving an indication of the overall value of the flaws in the material being scanned.

12. A flaw detector for insulating materials including in combination a source of electric potential, elongated probe means comprising a comb-like structure having a plurality of tooth elements connected to said source of potential and positioned adjacent to but not contacting said material for electrically scanning a predetermined width of the insulating material being tested, respective current limiting resistors connected in series circuit relationship with each tooth element of said comb-like probe means, circuit means comprising a plurality of totaling networks with each of said networks being connected to a respective elemental length of said elongated probe means, a plurality of electron tubes having the control grids thereof coupled to a respective one of said totaling networks, control grid biasing means for controlling the point of operation of said electron tube in accordance with the number and type of flaws to be detected, and marking apparatus positioned adjacent said probe means comprising a plurality of electrically operated marking devices, each of said marking devices being physically disposed adjacent a respective elemental length of said probe means and electrically connected to the output of the electron tube corresponding to its respective elemental length of the probe means whereby the location of flaws detected by said probe means is marked on the insulating material.

13. A flaw detector for insulating materials including in combination a source of electric potential, elongated probe means connected to said source of potential for electrically scanning a predetermined width of the insulating material being tested, circuit means comprising a plurality of totaling networks with each of said networks being connected to a respective elemental length of said elongated probe means, a plurality of electron tubes having the control grids thereof coupled to a respective one of said totaling networks, control grid biasing means for controlling the point of operation of said electron tube in accordance with the number and type of flaws to be detected, and a quality measuring circuit operatively coupled to said probe means for producing an indication of the overall quality of the insulating material, said quality measuring circuit comprising an integrating circuit coupled across all of said totaling networks, and an indicating instrument operatively coupled to said integrating circuit.

14. A flaw detector for insulating materials including in combination a source of electric potential, elongated probe means connected to said source of potential for electrically scanning a predetermined width of the insulating material being tested, and circuit means comprising a plurality of totaling networks with each of said networks being connected to a respective elemental length of said elongated probe means, a plurality of electron tubes having the control grids thereof coupled to a respective one of said totaling networks, and control grid biasing means for controlling the point of operation of said electron tube in accordance with the number and type of flaws to be detected, marking apparatus positioned adjacent said probe means comprising a plurality of electrically operated marking devices, each of said marking devices being physically disposed adjacent a respective elemental length of said probe means and electrically connected to the output of the electron tube corresponding to its respective elemental length of the probe means, a quality measuring circuit operatively coupled to said probe means for producing an indication of the overall quality of the insulating material, said quality measuring circuit comprising an integrating circuit coupled across all of said totaling networks, and an indicating instrument operatively coupled to said integrating circuit, and additional probe means for precharging the insulating material prior to scanning the same with said first mentioned probe means.

15. A flaw detector for insulating materials including in combination a source of electric potential, elongated probe means connected to said source of potential for electrically scanning a predetermined width of the insulating material being tested, circuit means comprising a plurality of totaling networks, each of said networks being connected to a respective elemental length of said elongated probe means, a plurality of electron tubes having the respective control grids thereof coupled to a respective one of said totaling networks, and control grid biasing means including an adjustable steady state biasing network connected to the control grids of said electron tubes for adjusting the point of operation of said electron tubes on the plate current versus control grid voltage characteristic curve thereof in accordance with the number and type of flaws to be detected, speed signal generator means for deriving a varying signal proportional to the speed of travel of the insulating material relative to said probe means, and connector means operatively connecting the output of said speed signal generator means to the control grids of said electron tubes whereby the current flow produced in the plate circuit of each of said electron tubes is indicative of the type and number of flaws existing in the portion of the insulating material scanned by the respective elemental length of said probe means associated with the particular electron tube.

16. A flaw detector for insulating materials including in combination a source of electric potential, elongated probe means connected to said source of potential for electrically scanning a predetermined width of the insulating material being tested, circuit means comprising a plurality of totaling networks, each of the networks being connected to a respective elemental length of said elongated probe means, a plurality of electron tubes having the respective control grids thereof coupled to a respective one of said totaling networks, control grid biasing means including an adjustable steady state biasing network connected to the control grids of said electron tubes for adjusting the point of operation of said electron tubes on the plate current versus control grid voltage characteristic curve thereof in accordance with the number and type of flaws to be detected, speed signal generator means for deriving a varying signal proportional to the speed of travel of the insulating material relative to said probe means, and connector means operatively connecting the output of said speed signal generator means to the control grids of said electron tubes whereby the current flow produced in the plate circuit of each of said electron tubes is indicative of the type and number of flaws existing in the portion of the insulating material scanned by the respective elemental length of said probe means associated with a particular electron tube, and a quality measuring circuit operatively coupled to said probe means for producing an indication of the overall quality of the insulating material, said measuring circuit comprising an adjustable integrating circuit coupled across all of said totaling networks, an electron tube having the input thereof coupled to said integrating circuit and having a load impedance connected in the output circuit thereof, and an indicating instrument coupled across said load impedance.

17. A flaw detector for insulating materials including in combination a source of electric potential, elongated probe means connected to said source of potential for electrically scanning a predetermined width of the insulating material being tested, circuit means comprising a plurality of totaling networks, each of the networks being connected to a respective elemental length of said elongated probe means, a plurality of electron tubes having the respective control grids thereof coupled to a respective one of said totaling networks, and control grid biasing means including an adjustable steady state biasing network connected to the control grids of said electron tubes for adjusting the point of operation of said electron tubes on the plate current versus control grid voltage characteristic curve thereof in accordance with the number and type of flaws to be detected, speed signal generator means for deriving a varying signal proportional to the speed of travel of the insulating material relative to said probe means, and connector means operatively connecting the output of said speed signal generator means to the control grids of said electron tubes whereby the current flow produced in the plate circuit of each of said electron tubes is indicative of the type and number of flaws existing in the portion of the insulating material scanned by the respective elemental length of said probe means associated with the particular electron tube, marking apparatus positioned adjacent said probe means and comprising a plurality of electrically operated marking devices, each of said marking devices being physically disposed adjacent a respective elemental length of said probe means and electrically connected to the output of the electron tube corresponding to its respective elemental length of the probe means, a quality measuring circuit operatively coupled to said probe means for producing an indication of the overall quality of the insulating material, said measuring circuit comprising an adjustable time constant integrating circuit coupled across all of said totaling networks, an electron tube having the input thereof coupled to said integrating circuit and having a load impedance connected in the output circuit thereof, and an indicating instrument coupled across said load impedance, and additional probe means disposed adjacent the insulating material and connected to said source of potential for precharging the insulating material prior to scanning the same with said first mentioned probe means.

18. A flaw detector for insulating materials including in combination a source of electric potential, probe means for scanning desired portions of an insulating material, said probe means comprising a plurality of longitudinally aligned, separate conductive combs each having a plurality of pointed probe teeth, a resistor connected in series circuit relation with each of said probe teeth, said probe teeth and the respective resistors thereof being connected in parallel circuit relationship to one terminal of said source of potential, and conductive means comprising a plurality of aligned, separate conductive members operatively connected in parallel circuit relationship to the remaining terminal of said source of potential, said conductive members corresponding in number to the number of said combs and being disposed adjacent the pointed ends of the probe teeth with the portion of the insulating material to be tested being positioned between the pointed ends of the probe teeth and said conductive members, circuit means comprising a plurality of totaling networks, each of the networks being connected to a respective one of said conductive members, a plurality of electron tubes having the respective control grids thereof coupled to a respective one of said totaling networks, control grid biasing means including an adjustable steady state biasing network connected to the control grids of said electron tubes for adjusting the point of operation of said electron tubes on the plate current versus control grid voltage characteristic curve thereof in accordance with the number and type of flaws to be detected, speed signal generator means for deriving a varying signal proportional to the speed of travel of the insulating material relative to the probe means, and connector means operatively connecting the output of said speed signal generator means to the control grids of said electron tubes whereby the current flow produced in the plate circuit of each of said electron tubes is indicative of the type and number of flaws existing in the portion of the insulating material scanned by the respective comb and conductive member associated with a particular electron tube, marking apparatus positioned adjacent said probe means, said marking apparatus comprising a plurality of solenoid operated fluid discharge valves connected through a fluid passageway to a container of marking fluid, each of said fluid discharge valves being physically disposed adjacent a respective one of said combs and having the field winding of the solenoid thereof electrically connected in the plate circuit of the respective electron tube associated with its respective comb whereby a predetermined amount of marking fluid may be ejected upon the portions of insulating material having flaws detected by said probe means, a quality measuring circuit operatively coupled to said probe means for producing an indication of the overall quality of the insulating material, said measuring circuit comprising an adjustable time constant integrating circuit coupled across all of said totaling networks, an electron tube having the input thereof coupled to said integrating circuit and having a load impedance connected in the output circuit thereof, and an indicating instrument coupled across said load impedance, additional probe means disposed adjacent the insulating material and connected to said source of potential for precharging the insulating material prior to scanning the same with said first mentioned probe means, and automatic shut-off means operatively coupled to said integrating circuit for deenergizing said detector upon the occurrence of overload conditions due to breakage or termination of the insulating material.

19. A flaw detector for dielectric materials including first probe means disposed adjacent the insulating material for producing an electrostatic field through which the insulating material passes, signal deriving circuit means operatively connected to said probe means for producing signals identifying changes in the structure of the insulating material, and additional probe means disposed adjacent said first probe means for precharging the dielectric material prior to scanning the same with said first probe means.

20. A flaw detector for insulating materials including in combination a source of electric potential, elongated probe means connected to said source of potential for electrically scanning a predetermined width of the insulating material being tested, circuit means comprising a plurality of signal developing circuits, each of said circuits being coupled to a respective elemental length of said elongated probe means with all of said circuits serving to produce identifying signals indicative of the location and extent of flaws existing in the insulating material, and a quality measuring circuit operatively coupled to said probe means for producing an indication of the overall quality of the insulating material.

21. A flaw detector for insulating materials including in combination a source of electric potential, elongated probe means connected to said source of potential for scanning a predetermined width of the insulating material being tested with an electric field, circuit means including a plurality of grid controlled electron discharge devices having the respective control grids thereof operatively coupled to a respective elemental length of said elongated probe means for developing electric signals indicative of the flaws existing in the insulating material under inspection, and quality measuring means operatively coupled to all said electron discharge devices for deriving an output signal indicative of the overall quality of the insulating material.

22. A flaw detector for insulating materials including in combination a source of electric potential, elongated probe means connected to said source of potential for scanning a predetermined width of insulation material under inspection with an electric field, a plurality of adjustable cut-off point signal developing circuits, each of said circuits being coupled to a respective elemental length of said elongated probe means and serving to produce an electric output signal indicative of the location and extent of flaws existing in the insulating material, and means for automatically adjusting the cut-off point of said signal developing circuits in proportion to the relative rate of movement between the material under inspection and said probe means.

23. A flaw detector for insulating materials including in combination a source of electric potential, elongated probe means connected to said source of potential for scanning a predetermined width of the insulating material being tested with an electric field, circuit means including a plurality of grid controlled discharge devices having the respective control grids thereof operatively coupled to a respective elemental length of said elongated probe means for developing electric signals indicative of the flaws existing in the insulating material under inspection, and means for automatically adjusting the control grid bias supplied to said electron discharge devices in proportion to the relative rate of movement between the material under inspection and said probe means.

References Cited in the file of this patent

UNITED STATES PATENTS

| | | |
|---|---|---|
| 679,521 | Thordarson | July 30, 1901 |
| 1,407,887 | Pigeon | Feb. 28, 1922 |
| 1,692,700 | Rae | Nov. 20, 1928 |
| 2,220,489 | Lowkrantz | Nov. 5, 1940 |

OTHER REFERENCES

Abstract of application of Paul C. Gardiner, Ser. No. 127,549, filed Nov. 16, 1949, published Jan. 1, 1952.